US012617207B2

(12) United States Patent
Kikuchi et al.

(10) Patent No.: US 12,617,207 B2
(45) Date of Patent: May 5, 2026

(54) LIQUID DISCHARGE APPARATUS

(71) Applicants: Teppei Kikuchi, Kanagawa (JP); Hiroyuki Yamashita, Kanagawa (JP); Yasunobu Takagi, Kanagawa (JP); Nanami Takano, Tokyo (JP); Kaoru Satoh, Nagano (JP)

(72) Inventors: Teppei Kikuchi, Kanagawa (JP); Hiroyuki Yamashita, Kanagawa (JP); Yasunobu Takagi, Kanagawa (JP); Nanami Takano, Tokyo (JP); Kaoru Satoh, Nagano (JP)

(73) Assignee: RICOH COMPANY, LTD., Tokyo (JP)

( * ) Notice: Subject to any disclaimer, the term of this patent is extended or adjusted under 35 U.S.C. 154(b) by 240 days.

(21) Appl. No.: 18/515,278

(22) Filed: Nov. 21, 2023

(65) Prior Publication Data

US 2024/0165955 A1 May 23, 2024

(30) Foreign Application Priority Data

Nov. 22, 2022 (JP) ................................ 2022-186508

(51) Int. Cl.
*B41J 2/165* (2006.01)

(52) U.S. Cl.
CPC ........ *B41J 2/16523* (2013.01); *B41J 2/16514* (2024.05); *B41P 2235/27* (2013.01)

(58) Field of Classification Search
CPC . B41J 2/16523; B41J 2/16532; B41J 2/16552
See application file for complete search history.

(56) References Cited

U.S. PATENT DOCUMENTS

| | | | |
|---|---|---|---|
| 2009/0018881 | A1 | 1/2009 | Ito et al. |
| 2009/0262171 | A1 | 10/2009 | Yamashita |
| 2010/0182367 | A1 | 7/2010 | Takagi et al. |
| 2013/0050363 | A1 | 2/2013 | Usui et al. |
| 2013/0057879 | A1 | 3/2013 | Takagi et al. |
| 2013/0093810 | A1 | 4/2013 | Suzuki et al. |
| 2014/0043391 | A1 | 2/2014 | Satoh et al. |
| 2014/0071196 | A1 | 3/2014 | Hihara et al. |
| 2014/0240422 | A1 | 8/2014 | Suzuki et al. |
| 2016/0101630 | A1 | 4/2016 | Takagi |
| 2017/0165970 | A1 | 6/2017 | Yokoyama et al. |

(Continued)

FOREIGN PATENT DOCUMENTS

| | | | |
|---|---|---|---|
| JP | 2007-296779 | A | 11/2007 |
| JP | 2010-142722 | A | 7/2010 |

(Continued)

*Primary Examiner* — Sharon Polk
(74) *Attorney, Agent, or Firm* — XSENSUS LLP

(57) ABSTRACT

A liquid discharge apparatus includes: a liquid discharge head having a discharge face having a nozzle from which a liquid is discharged to a medium; a carriage, to which the liquid discharge head is mountable, and reciprocally movable in a main-scanning direction; a guide supporting the carriage to guide the carriage to move in the main-scanning direction; a cap to contact and seal the discharge face of the liquid discharge head; a suction device connected to the cap; and a cap cleaner, supported and guided by the guide to move in the main-scanning direction, to drop a cleaning liquid to the cap.

19 Claims, 4 Drawing Sheets

(56) References Cited

U.S. PATENT DOCUMENTS

| | | | | |
|---|---|---|---|---|
| 2017/0173952 | A1 | 6/2017 | Takagi et al. | |
| 2019/0283403 | A1 | 9/2019 | Takagi | |
| 2019/0283459 | A1 | 9/2019 | Nakamura et al. | |
| 2019/0299692 | A1 | 10/2019 | Toda et al. | |
| 2020/0207087 | A1 | 7/2020 | Tanaka et al. | |
| 2021/0245513 | A1* | 8/2021 | Kashiwagi | B41J 2/16535 |
| 2021/0394516 | A1* | 12/2021 | Takahashi | B41J 2/16523 |
| 2022/0074098 | A1 | 3/2022 | Yamashita | |
| 2022/0258476 | A1 | 8/2022 | Yamashita | |
| 2022/0371330 | A1 | 11/2022 | Takano et al. | |
| 2023/0026383 | A1 | 1/2023 | Kikuchi et al. | |
| 2024/0059068 | A1* | 2/2024 | Kimoto | B41J 2/16579 |
| 2024/0100832 | A1* | 3/2024 | Kajihara | B41J 2/16547 |
| 2024/0109322 | A1* | 4/2024 | Satoh | B41J 2/16523 |

FOREIGN PATENT DOCUMENTS

| | | | |
|---|---|---|---|
| JP | 2015-217593 | A | 12/2015 |
| JP | 2015-231729 | A | 12/2015 |
| JP | 2016-159526 | A | 9/2016 |
| JP | 2016-159527 | A | 9/2016 |
| JP | 2017-065262 | A | 4/2017 |
| JP | 2020-059188 | A | 4/2020 |
| JP | 2021-115747 | A | 8/2021 |

* cited by examiner

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-186508, filed on Nov. 22, 2022, in the Japan Patent Office, the entire disclosure of which is hereby incorporated by reference herein.

BACKGROUND

Technical Field

The present disclosure relates to a liquid discharge apparatus.

Related Art

As a liquid discharge apparatus, for example, an ink jet record apparatus including a liquid discharge head for discharging droplets of ink onto a medium to be discharged such as a sheet is known. In such a liquid discharge apparatus, it is known that a technique includes a cap for covering the discharge face (nozzle face) of the liquid discharge head, the discharge face is covered with the cap when printing (also referred to as recording or image formation) is not performed, thereby preventing drying of ink or preventing clogging by sucking with a pump connected to the cap.

In recent years, various inks have been used with the spread of ink jet technology. Some inks have characteristics such as high viscosity, low solubility, quick-drying property, and others have quickly adhere to the cap, and the ink adhered to the cap may be fixed and accumulated with time. On the other hand, there are technologies for cleaning the ink adhered to and accumulated on the cap.

It is preferable that the ink adhered to the cap can be washed at any timing while printing because the ink is likely to be fixed due to the progress of drying when the cap is left open for a long time while printing.

SUMMARY

A liquid discharge apparatus includes: a liquid discharge head having a discharge face having a nozzle from which a liquid is discharged to a medium; a carriage, to which the liquid discharge head is mountable, and reciprocally movable in a main-scanning direction; a guide supporting the carriage to guide the carriage to move in the main-scanning direction; a cap to contact and seal the discharge face of the liquid discharge head; a suction device connected to the cap; and a cap cleaner, supported and guided by the guide to move in the main-scanning direction, to drop a cleaning liquid to the cap.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
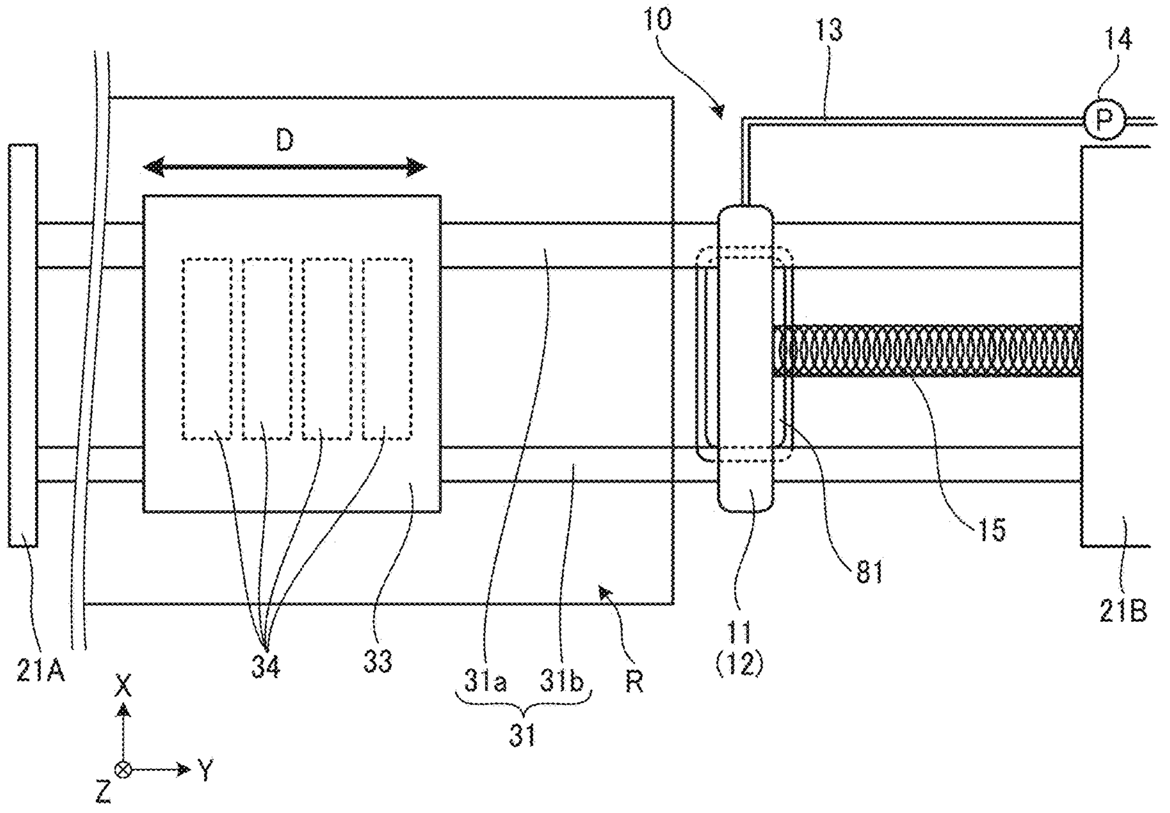
FIG. 1 is a plan view of a main part of a liquid discharge apparatus according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to the present disclosure, a liquid discharge apparatus that can clean a cap without interrupting a printing operation and independently quickly attach and detach a cleaning member to discharge liquid.

A liquid discharge apparatus according to the present disclosure will be described with reference to the drawings. Although the present disclosure is not limited to the embodiments described below, and can be modified within a range that can be conceived by a person skilled in the art, such as addition, change, or deletion of other embodiments, and any of the embodiments is included in the scope of the present invention as long as the functions and effects of the present invention are achieved.

Figure 2:
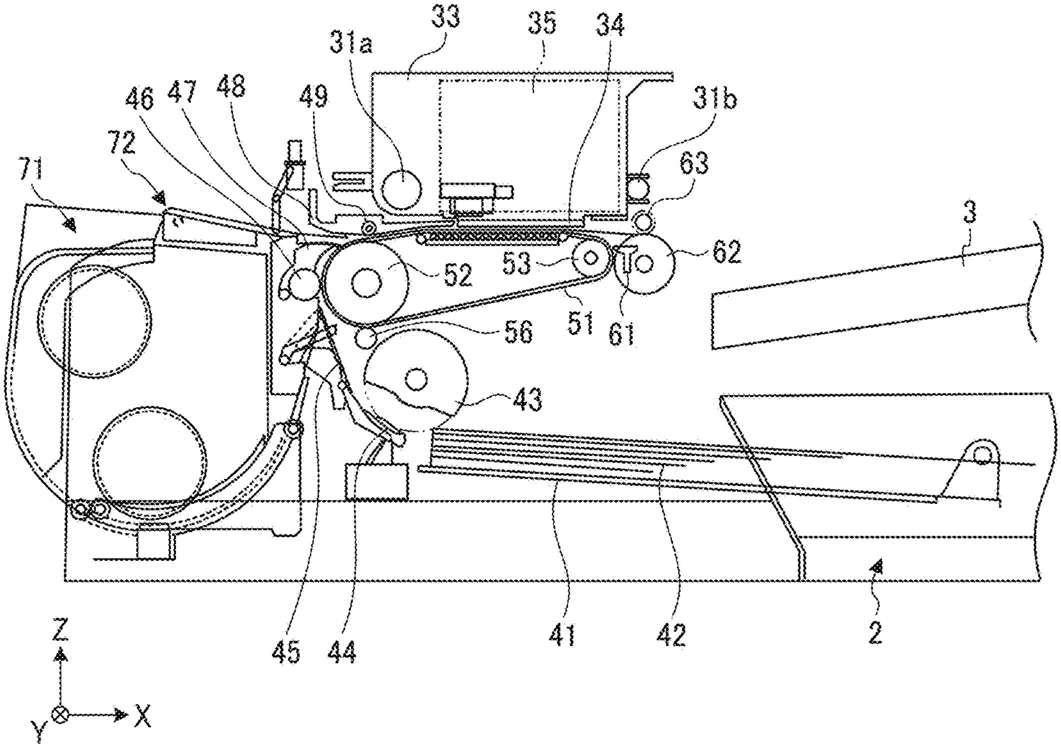
FIG. 2 is a side view of a whole configuration of the liquid discharge apparatus according to an embodiment.

FIG. 1 is a side view of a whole configuration of the liquid discharge apparatus according to an embodiment. FIG. 2 is side view of a whole configuration of a serial inkjet record apparatus as an example of the liquid discharge apparatus.

The liquid discharge apparatus includes a pair of guides 31*a* and 31*b* (e.g., guide rods) that are horizontally stretched on left and right side plates 21A and 21B which are parts of a housing. The guide 31 (guide rod) holds the carriage 33 that can slide in the main-scanning direction D. The carriage 33 is driven by a main-scanning motor via a timing belt. As a result, the carriage 33 moves and scans along the main-scanning direction D (carriage main-scanning direction).

The carriage 33 includes a liquid discharge head 34 for discharging ink droplets of each color of yellow (Y), cyan (C), magenta (M), and black (K). The liquid discharge head 34 is configured by arranging nozzle rows including multiple nozzles in a sub-scanning direction perpendicular to the main-scanning direction. Each nozzle is disposed so that the discharge direction of the ink droplet is downward.

Further, the carriage 33 includes a head tank 35 for supplying ink of each color corresponding to the nozzle array of the liquid discharge head 34. Ink of each color is supplied to the head tank 35 from an ink cartridge of each color through a supply tube of each color.

As illustrated in FIG. 2, the inkjet record apparatus includes a sheet feeder for feeding a sheet 42 as a record medium stacked on a sheet stack member 41 (i.e., pressure plate) of the sheet feed tray 2. The sheet feeder includes a sheet feed roller 43 (i.e., semi-circular roller) for separating and feeding the sheet 42 one by one from the sheet stack member 41, and a separation pad 44 containing a material having a large coefficient of friction and disposed opposite to the sheet feed roller 43. The separation pad 44 is biased toward the sheet feed roller 43.

A paper guide 45 for guiding the sheet 42 and a counter roller 46 are disposed so as to feed the sheet 42 fed from the sheet feeder to the lower side of the liquid discharge head 34. Further, the feed guide 47 and the press member 48 including the tip press roller 49 are disposed. Further, a conveyor belt 51 for electrostatically absorbing the sheet 42 that is fed and conveying the sheet 42 to a position opposed to the liquid discharge head 34 is disposed. The conveyor belt 51 is an endless belt, and is bridged between the conveyor roller 52 and the tension roller 53. A charging roller 56 for charging the surface of the conveyor belt 51 is disposed. A charging roller 56 touches the surface layer of the conveyor belt 51 and disposed so as to rotate as following the rotation of the conveyor belt 51. When the conveyor roller 52 is rotationally driven by the sub-scanning motor via the timing belt, the conveyor belt 51 moves around in the belt conveyor direction (i.e., sub-scanning direction).

In addition, a sheet discharge member for discharging the sheet 42 recorded by the liquid discharge head 34 is disposed. The sheet discharge member includes a separation claw 61 for separating the sheet 42 from the conveyor belt 51, a sheet discharge roller 62, and a sheet discharge roller 63. A discharge tray 3 is disposed below the sheet discharge roller 62.

A double-sided unit 71 can be attached and detached on the back portion. The double-sided unit 71 takes in and reverses the sheet 42 returned by the reverse rotation of the conveyor belt 51, and feeds the sheet 42 again between the counter roller 46 and the conveyor belt 51. A manual feed tray 72 is disposed on the upper surface of the double-sided unit 71.

The printing operation is performed by driving the liquid discharge head 34 in accordance with an image signal while moving the carriage 33. Ink droplets are discharged from the liquid discharge head 34 onto the sheet 42, which stops, to record an object such as a character or an image for one line, and after the sheet 42 is conveyed by a predetermined amount, the object of the next line is recorded. When the recording end signal is received or when the arrival of the rear end of the sheet 42 to the record area is detected, the printing operation is ended and the sheet 42 is discharged to the discharge tray 3.

Figure 3:
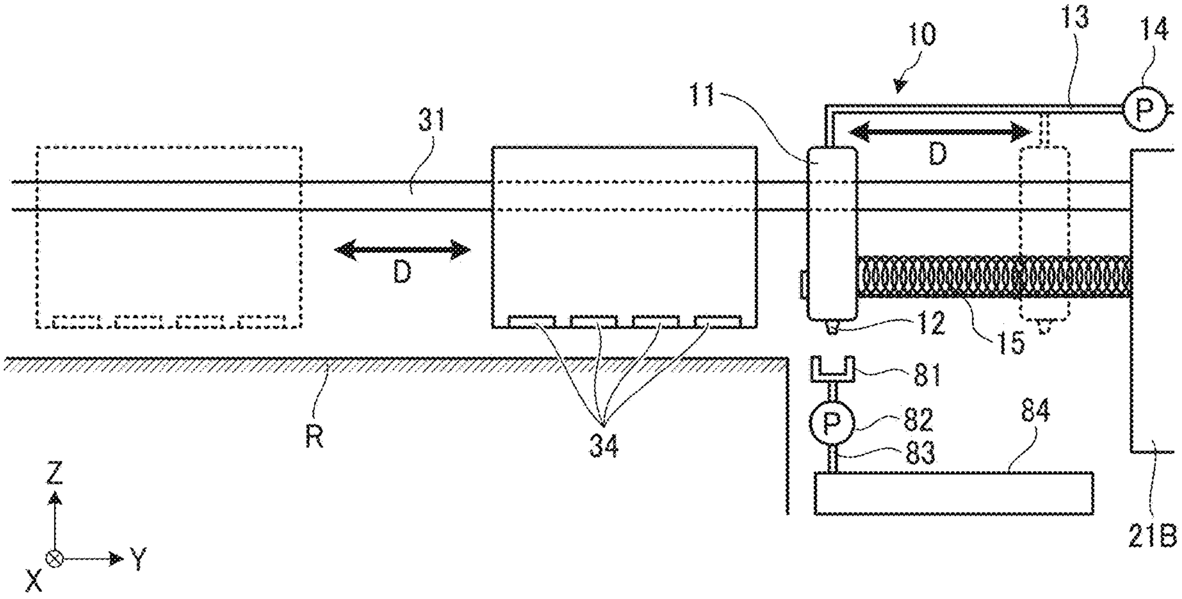
FIG. 3 is a side view of a main part of the liquid discharge apparatus according to an embodiment.

FIG. 3 is a side view of a main part of the liquid discharge apparatus according to an embodiment. As illustrated in FIGS. 1 and 3, a cap 81 as a maintenance and recovery mechanism for maintaining and recovering the state of the nozzles of the liquid discharge head 34 is disposed in a non-printing region on one side (the right side in the drawing) of the printing region R.

The cap 81 caps the discharge face (nozzle face) of each liquid discharge head 34 to prevent evaporation of moisture of ink as liquid to be discharged. A suction pump 82 as a suction device is connected to the cap 81 via a flexible waste liquid tube 83. Suction is operated while the cap 81 is capping the discharge face of the liquid discharge head 34 to remove the ink having high viscosity adhered around the wall surface of the nozzle and the discharge opening of the nozzle. The waste liquid sucked by the suction pump 82 is stored in a waste liquid tank 84. The cap 81 caps has functions to keep moisture that prevent liquid evaporation in the liquid discharge head 34 and suck.

The cap may include a moisturization cap to which no suction device is connected, or a wiper to wipe the discharge face as a maintenance and recovery unit.

In the present embodiment, a liquid discharge apparatus includes: a liquid discharge head 34 to discharge liquid to a medium; a carriage 33 to mount the liquid discharge head 34 and reciprocally move in a main-scanning direction; a guide 31 to support the carriage 33 to move; a cap 81 to touch a discharge face of the liquid discharge head 34 and to seal the discharge face; a suction pump 82 (i.e., suction device) to connect to the cap 81; and a cap cleaner 10 to drop cleaning liquid to the cap 81.

Figure 4:
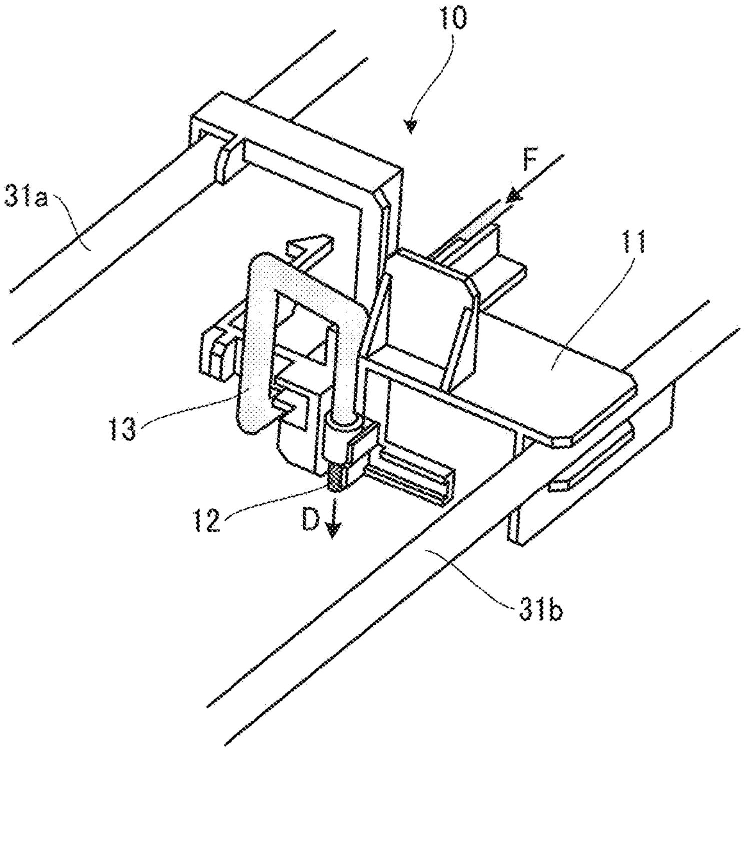
FIG. 4 is a perspective view of a cap cleaner.

FIG. 4 is a perspective view of a cap cleaner as an example. A cap cleaner 10 includes a channel 13 (flow path) for supplying a cleaning liquid, a dropper 12 for dropping the cleaning liquid, and a holder 11 for holding the channel 13 and the dropper 12, and the holder 11 can be attached and detached to the guide 31.

In at least some embodiments, a liquid discharge apparatus includes; a liquid discharge head having a discharge face having a nozzle from which a liquid is discharged to a medium; a carriage, to which the liquid discharge head is mountable, and reciprocally movable in a main-scanning direction; a guide supporting the carriage to guide the carriage to move in the main-scanning direction; a cap to contact and seal the discharge face of the liquid discharge head; a suction device connected to the cap; and a cap cleaner, supported and guided by the guide to move in the main-scanning direction, to drop a cleaning liquid to the cap.

In at least some embodiments, in the liquid discharge apparatus, the cap cleaner includes: a dropper to drop the cleaning liquid to the cap; and a channel to supply the cleaning liquid to the dropper; and a holder holding the channel and the dropper.

In at least some embodiments, in the liquid discharge apparatus, the holder is detachably attachable to the guide.

A pump (i.e., cleaning liquid pump 14, see FIGS. 1 and 3) for feeding the cleaning liquid and a cleaning liquid storage unit are connected to the upstream of the channel 13, and the cleaning liquid flows in from the direction indicated by an arrow F in the drawing. The cleaning liquid pump 14 includes, for example, a tube pump. When the cap cleaner 10 is located at a position opposed to the cap 81, the cleaning liquid of the pump is dropped from the dropper 12 in a direction indicated by an arrow D in the drawing.

It is preferable that the pump (i.e., cleaning liquid pump 14) for feeding the cleaning liquid performs a reverse operation after the drive motor stops when the dropping of the cleaning liquid is stopped. In the liquid discharge apparatus according to the present embodiment, as illustrated in FIG. 3, since the cap cleaner 10 is configured to move in the main scanning direction indicated by arrow D which is the same as that of the carriage 33, the cleaning liquid may leak from the dropper 12 due to, for example, vibration when the cap cleaner 10 moves from a position facing the cap 81. By contrast, by reversing the drive motor by a predetermined amount, the cleaning liquid in the dropper 12 is returned to the side of the channel 13, and leakage of the cleaning liquid from the dropper 12 can be prevented.

In at least some embodiments, in the liquid discharge apparatus, the cap cleaner includes a pump connected to the dropper through the channel, and the pump: feeds the cleaning liquid from the pump to the dropper through the channel in a first direction; or feeds the cleaning liquid from the dropper to the pump through the channel in a second direction opposite to the first direction, and the pump feeds the cleaning liquid from the dropper in the second direction in response to a stop of a dropping operation of the cap cleaner to the cap.

Figure 5A:
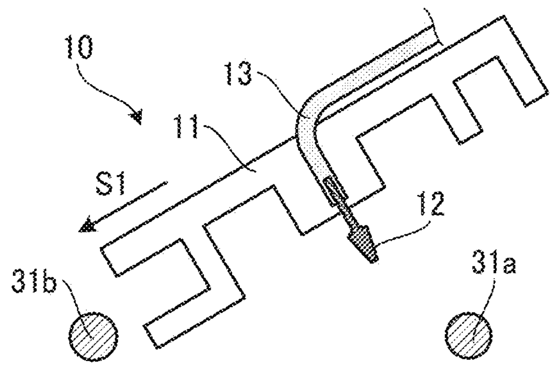
FIG. 5A is a diagram of attachment and detachment of the cap cleaner.
Figure 5B:
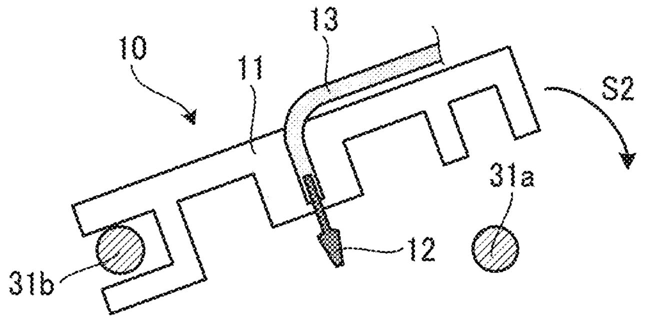
FIG. 5B is a diagram of attachment and detachment of the cap cleaner.
Figure 5C:
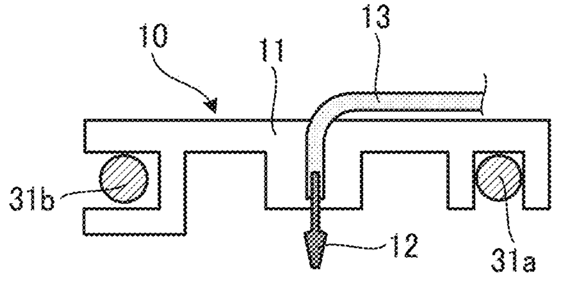
FIG. 5C is a diagram of attachment and detachment of the cap cleaner.

FIGS. 5A to 5C are diagrams of a process of attachment of the cap cleaner 10 to the guide 31. Similar to the example illustrated in FIG. 4, the cap cleaner 10 of the present embodiment has a structure that engages with a pair of guides 31*a* and 31*b* in a direction perpendicular to each other. The holder 11 illustrated in FIGS. 4, and 5A to 5C engages the guide 31*a* in the vertical direction and engages the guide 31*b* in the horizontal direction.

First, as illustrated in FIG. 5A, the holder 11 is moved in the direction indicated by an arrow S1, and the one end of the holder 11 is engaged in the horizontal direction so that the guide 31*b* is sandwiched in the horizontal direction by the holder 11. As illustrated in FIG. 5B, another end of the holder 11 is rotated in the direction indicated by an arrow S2 using the already engaged one end as a fulcrum. As illustrated in FIG. 5C, the another end of the holder 11 is engaged in the vertical direction so that the guide 31*a* is held vertically by the holder 11. As described above, the cap cleaner 10 can be mounted on the guide 31*a* and 31*b*.

By operating in the reverse flow (in the order of FIGS. 5C, 5B and 5A), the engagement between the holder 11 and the guide 31 is released, and the cap cleaner 10 can be quickly detached.

As described above, in the liquid discharge apparatus according to the present embodiment, only the cap cleaner 10 can be attached and detached. Thus, the cap cleaner 10 is not attached and detached together with the cap 81 and the carriage 33, and can be attached and detached independently and quickly. In a typical configuration in which the cleaning liquid supply member is configured with the cap 81 and the carriage 33 as one body, it has a difficulty in attaching and detaching the cap cleaner 10 only. By contrast, in the configuration according to the present embodiment, the replacement operation time, the number of replacement parts, and the cost can be reduced.

In at least some embodiments, in the liquid discharge apparatus, the cap cleaner is detachably attachable to the guide.

As illustrated in FIGS. 1 and 3, the liquid discharge apparatus according to the present embodiment includes an elastic member 15 for elastically biasing the cap cleaner 10 to a position opposed to the cap 81.

In at least some embodiments, the liquid discharge apparatus, further includes an elastic member elastically biasing the cap cleaner, to a facing position at which the cap cleaner faces the cap, in the main-scanning direction.

The elastic member 15 is a member that can expand and contract in the main-scanning direction in a state in which one end thereof is connected to the holder 11 and another end thereof is fixed to the right side plate 21B of the housing. Examples of the elastic member include a coil spring, a torsion spring, and a leaf spring.

In at least some embodiments, the liquid discharge apparatus, further includes a casing housing the liquid discharge head, the carriage, the guide, the cap, the suction device, and the cap cleaner. The elastic member expandable in the main-scanning direction, and the elastic member has: one end connected to the holder; and another end fixed to the casing.

As illustrated in FIG. 3, the cap cleaner 10 is mounted on the guides 31*a* and 31*b* and can move in the main-scanning direction indicated by an arrow D, which is the same as that of the carriage 33. Even when the cap cleaner 10 is moved to the right side in the drawing by pressing by the carriage 33, the cap cleaner 10 is biased by the elastic member 15 and returns to a position opposed to the cap 81 that is original when the pressing is released.

Figure 6A:
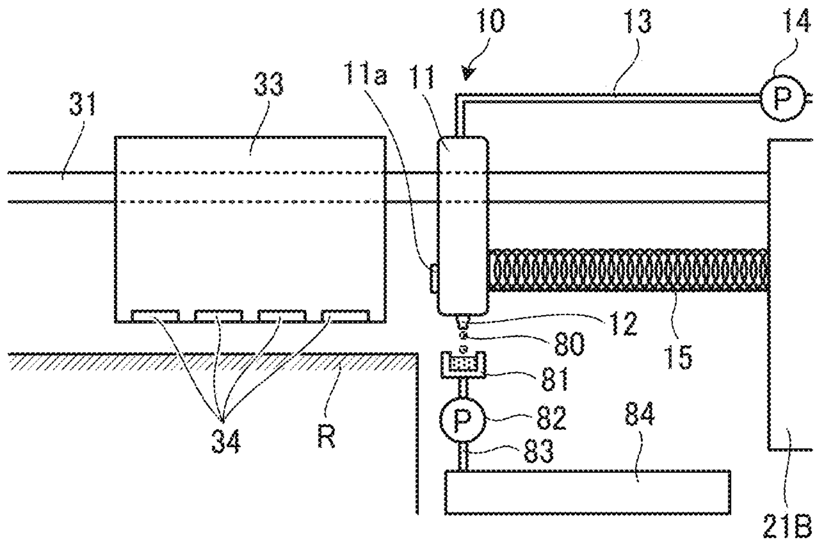
FIG. 6A is a diagram of displacement of the cap cleaner while printing.
Figure 6B:
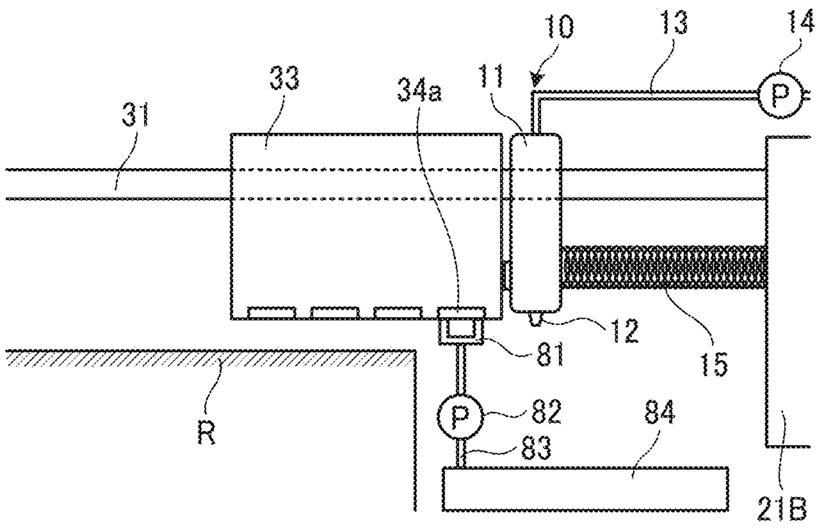
FIG. 6B is a diagram of displacement of the cap cleaner while capping.

FIGS. 6A and 6B are diagrams of different positions of the cap cleaner 10. In FIG. 6A, the cap cleaner 10 is located at a position during a printing operation. In FIG. 6B, the cap cleaner 10 is located at a position while the liquid discharge head 34 is capping.

As illustrated in FIG. 6A, when the carriage 33 is in the printing area R during the printing operation, the cap cleaner 10 is at a position facing the cap 81, that is, at a position at which the dropper 12 can drop the cleaning liquid 80 into the cap 81.

As illustrated in FIG. 6B, when the carriage 33 moves to the position in which the cap 81 and the discharge face of the liquid discharge head 34 come into contact with each other, the cap cleaner 10 is retracted from the position facing the cap 81 by pressing the carriage 33. Although FIG. 6B illustrates a state in which the discharge face of the liquid discharge head 34*a* is being capped, the same applies to a case where the discharge faces of the other three liquid discharge heads 34 are capped. In such a case, the cap cleaner 10 is further pressed by the carriage 33 and moves toward the right side in the drawing.

When the carriage 33 moves to the printing area Rafter capping the discharge face of the liquid discharge head 34, the cap cleaner 10 returns to a position opposed to the cap 81 by the biasing force of the elastic member 15 without depending on a member driven by power. It is preferable that the cap cleaner 10 includes a convex portion 11*a* for buffering an impact at the time of collision on a surface in contact with the carriage 33.

In at least some embodiments, in the liquid discharge apparatus, the fourth aspect, the carriage moves to a capping position at which the cap is contactable with the discharge face of the liquid discharge head to push the cap cleaner to be retracted from the facing position.

Drying and deposition of the liquid (ink) adhered to the cap 81 proceeds when the cap 81 is left open for a long time during the printing operation. However, in the liquid discharging apparatus of the present embodiment, as illustrated in FIG. 6A, since the cap 81 can be cleaned at any timing without interrupting the printing operation, the liquid (ink) can be prevented from adhering to the cap 81. In particular, when the cleaning liquid 80 is dropped onto the cap 81 at a high frequency, the productivity is prevented from decreasing.

By contrast, if the cleaning liquid 80 is not dropped on the cap 81 depending on the type of the liquid (ink) to be discharged, the cap cleaner 10 may be detached from the apparatus. By installing the cap cleaner 10 that can be independently and quickly detached and attached, working efficiency at the time of component replacement can be increased and the cost can be reduced.

The term "liquid discharge apparatus" may include an apparatus for an object to which liquid can adhere, for example, a feeder, a conveyor, and a sheet discharger and also a pre-processing apparatus, or a post-processing apparatus.

Examples of the "liquid discharge apparatus" include an image formation apparatus which is an apparatus for discharging ink on a sheet to form an image, and a three dimensional molding apparatus which discharges a molding liquid onto a powder layer in which powder is formed in a layered form in order to mold a three dimensional molded article. Further, the "liquid discharge apparatus" is not limited to an apparatus in which a significant image such as characters and figures is visualized by the discharged liquid. For example, an image formation apparatus which forms, for example, a pattern having no meaning by itself or an image formation apparatus which forms a three dimensional image is also included.

The term "an object to which a liquid can be attached" includes an object to which liquid can be attached at least temporarily and which is adhered and fixed or adhered and penetrated. Specific examples of the object include recording media such as paper, recording paper, recording paper, a film, a sheet, and cloth, electronic substrates, electronic components such as piezoelectric elements, powder layers, organ models, and test cells, and all media to which liquid adheres are included unless otherwise specified.

Examples of the material of "an object to which a liquid can be attached" may include thread, fiber, fabric, leather, metal, plastic, glass, wood, ceramics, or a combination thereof, to which a liquid can adhere, even if the adhesion is temporal.

The "liquid" is not particularly limited as long as it has a viscosity or surface tension that can be discharged from the head, but it is preferable that the viscosity becomes 30 millipascal second (mPa·s) or less at room temperature and under normal pressure or by heating or cooling. Specifically, examples of the liquid include solutions, suspensions, and emulsions containing solvents such as water and organic solvents, coloring agents such as dyes and pigments, functional imparting materials such as polymerizable compounds, resins, surfactants, and biocompatible materials such as DNAs, amino acids, proteins, and calcium, and ingredients such as natural dyes. These materials can be used, for example, in an inkjet ink, a surface treatment liquid, a liquid for forming a component of an electronic element or a light-emitting element or an electronic circuit resist pattern, and a three dimensional molding material liquid.

Further, as the "liquid discharge apparatus", there is also a treatment liquid applying apparatus which discharges a treatment liquid to a sheet in order to apply the treatment liquid to the surface of the sheet for the purpose of reforming the surface of the sheet. Further, there is also a spray granulator which sprays a composition liquid in which a raw material is dispersed in a solution through a nozzle to granulate fine particles of the raw material.

The "liquid discharge head" is a functional device for discharging liquid from nozzles. As an energy generation source for discharging the liquid, a piezoelectric actuator (laminated piezoelectric element or thin film piezoelectric element), a thermal actuator using an electrothermal conversion element such as a heat generation resistor, or an electrostatic actuator including a diaphragm and a counter electrode is used.

In the present specification, the term "sheet" or "paper" is not limited to sheer or paper, but includes OHP, cloth, glass, and substrate, and includes a material to which ink droplets, and other liquid can adhere, and includes a medium to be recorded, a recording medium, a recording paper, and a recording paper. Unless otherwise specified, the term "ink" is not limited to ink, but is used as a general term for all liquids capable of performing image formation such as recording liquid, fixing liquid, and liquid, and includes, for example, DNA samples, resists, pattern materials, or resins. The term "image" is not limited to a planar image, but includes an image added to a three dimensionally formed object and an image formed by shaping a three dimensional object itself three dimensionally.

The terms "image formation," "recording," "printing," "impression," and "printing" are interchangeable with each other.

Aspects of the present invention is as follows, for example.

In a first aspect, a liquid discharge apparatus includes: a liquid discharge head to discharge liquid to a medium, a carriage to mount the liquid discharge head and reciprocally move in a main-scanning direction; a guide to support the carriage to move; a cap to touch a discharge face of the liquid discharge head and to seal the discharge face, a suction device to connect to the cap; and a cap cleaner to drop cleaning liquid to the cap. The cap cleaner includes: a channel to supply the cleaning liquid; a dropper to drop the cleaning liquid; and a holder to hold the channel and the dropper. The holder is attached and detached to the guide.

In a second aspect, the liquid discharge apparatus according to the first aspect, includes an elastic member to elastically bias the cap cleaner to a position facing the cap.

In a third aspect, in the liquid discharge apparatus according to the second aspect, the elastic member expands and contracts in a main-scanning direction while one end of the elastic member is connected to the holder and another end of the elastic member is fixed to a casing.

In a fourth aspect, in the liquid discharge apparatus according to the first aspect or the second aspect, the cap cleaner retracts from a position facing the cap by pressure of the carriage when the carriage moves to a position at which the cap and the discharge face are in contact with each other.

In a fifth aspect, in the liquid discharge apparatus according to the first aspect or the second aspect, the cap cleaner is attached and detached.

In a sixth aspect, in the liquid discharge apparatus according to the first aspect or the second aspect, the cap cleaner includes a pump to send the cleaning liquid, the pump performs a reverse operation when the pump stops dropping the cleaning liquid after an drive motor stops.

In a seventh aspect, a liquid discharge apparatus includes: a liquid discharge head having a discharge face having a nozzle from which a liquid is discharged to a medium; a carriage, to which the liquid discharge head is mountable, and reciprocally movable in a main-scanning direction; a guide supporting the carriage to guide the carriage to move in the main-scanning direction; a cap to contact and seal the discharge face of the liquid discharge head; a suction device connected to the cap; and a cap cleaner, supported and guided by the guide to move in the main-scanning direction, to drop a cleaning liquid to the cap.

In an eighth aspect, in the liquid discharge apparatus, the cap cleaner includes: a dropper to drop the cleaning liquid to the cap; and a channel to supply the cleaning liquid to the dropper; and a holder holding the channel and the dropper.

In a ninth aspect, in the liquid discharge apparatus according to the eighth aspect, the holder is detachably attachable to the guide.

In a tenth aspect, the liquid discharge apparatus according to the eighth aspect, further includes an elastic member elastically biasing the cap cleaner, to a facing position at which the cap cleaner faces the cap, in the main-scanning direction.

In an eleventh aspect, the liquid discharge apparatus according to the tenth aspect, further includes a casing housing the liquid discharge head, the carriage, the guide, the cap, the suction device, and the cap cleaner. The elastic member expandable in the main-scanning direction, and the elastic member has: one end connected to the holder; and another end fixed to the casing.

In a twelfth, in the liquid discharge apparatus according to any one of the seventh aspect to the eleventh aspect, the fourth aspect, the carriage moves to a capping position at which the cap is contactable with the discharge face of the liquid discharge head to push the cap cleaner to be retracted from the facing position.

In a thirteenth aspect, in the liquid discharge apparatus according to any one of the seventh aspect to the twelfth aspect, the cap cleaner is detachably attachable to the guide.

In a fourteenth aspect, in the liquid discharge apparatus according to any one of the seventh aspect to the thirteenth aspect, the cap cleaner includes a pump connected to the dropper through the channel, and the pump: feeds the cleaning liquid from the pump to the dropper through the channel in a first direction; or feeds the cleaning liquid from the dropper to the pump through the channel in a second direction opposite to the first direction, and the pump feeds the cleaning liquid from the dropper in the second direction in response to a stop of a dropping operation of the cap cleaner to the cap.

The invention claimed is:

1. A liquid discharge apparatus comprising:
- a liquid discharge head having a discharge face having a nozzle from which a liquid is discharged to a medium;
- a carriage, to which the liquid discharge head is mountable, and reciprocally movable in a main-scanning direction;
- a guide supporting the carriage to guide the carriage to move in the main-scanning direction;
- a cap to contact and seal the discharge face of the liquid discharge head;
- a suction device connected to the cap; and
- a cap cleaner, supported and guided by the guide to move in the main-scanning direction, to drop a cleaning liquid to the cap,
- wherein the cap cleaner includes:
- a dropper to drop the cleaning liquid to the cap;
- a channel connected to the dropper to supply the cleaning liquid to the dropper; and
- a holder holding the channel and the dropper.

2. The liquid discharge apparatus according to claim 1, wherein:
- the holder is detachably attachable to the guide.

3. The liquid discharge apparatus according to claim 1, further comprising:
- an elastic member elastically biasing the cap cleaner, to a facing position at which the cap cleaner faces the cap, in the main-scanning direction.

4. The liquid discharge apparatus according to claim 3, further comprising:
- a casing housing the liquid discharge head, the carriage, the guide, the cap, the suction device, and the cap cleaner,
- wherein:
- the elastic member extendable in the main-scanning direction, and
- the elastic member includes:
- one end connected to the holder; and
- another end fixed to the casing.

5. The liquid discharge apparatus according to claim 3, wherein;
- the carriage moves to a capping position at which the cap is contactable with the discharge face of the liquid discharge head to push the cap cleaner to be retracted from the facing position.

6. The liquid discharge apparatus according to claim 1, wherein:
- the cap cleaner includes a pump connected to the dropper through the channel, and
- the pump:
- feeds the cleaning liquid from the pump to the dropper through the channel in a first direction; or
- feeds the cleaning liquid from the dropper to the pump through the channel in a second direction opposite to the first direction in response to a stop of a dropping operation of the cap cleaner to the cap.

7. The liquid discharge apparatus according to claim 1, wherein:
- the suction device includes a pump.

8. The liquid discharge apparatus according to claim 1, further comprising:
- a flexible tube connected to the channel to supply the cleaning liquid, the flexible tube being a tube pump.

9. The liquid discharge apparatus according to claim 1, wherein:
- the holder is supported and guided by a first guide rod and a second guide rod of the guide, the first guide rod and the second guide rod being horizontally disposed.

10. The liquid discharge apparatus according to claim 1, wherein the cap cleaner further includes:
- a convex portion for buffering an impact on a surface in contact with the carriage.

11. The liquid discharge apparatus according to claim 1, further comprising:
- a cleaning liquid tank connected to the channel to supply the cleaning liquid.

12. The liquid discharge apparatus according to claim 1, wherein:
- the dropper is connected to a tank through the channel, the tank for storing the cleaning liquid.

13. A liquid discharge apparatus, comprising:
- a liquid discharge head having a discharge face having a nozzle from which a liquid is discharged to a medium;
- a carriage, to which the liquid discharge head is mountable, and reciprocally movable in a main-scanning direction;
- a guide supporting the carriage to guide the carriage to move in the main-scanning direction;
- a cap to contact and seal the discharge face of the liquid discharge head;
- a suction device connected to the cap; and
- a cap cleaner, supported and guided by the guide to move in the main-scanning direction, to drop a cleaning liquid to the cap,
- wherein the cap cleaner is detachably attachable to the guide.

14. The liquid discharge apparatus according to claim 13, wherein:
- the suction device includes a pump.

15. The liquid discharge apparatus according to claim 13, further comprising:

a flexible tube connected to a channel to supply the cleaning liquid, wherein the flexible tube is a tube pump.

16. The liquid discharge apparatus according to claim 13, further comprising:

a holder supported and guided by a first guide rod and a second guide rod of the guide, the first guide rod and the second guide rod being horizontally disposed.

17. The liquid discharge apparatus according to claim 13, wherein:

the cap cleaner further includes a convex portion for buffering an impact on a surface in contact with the carriage.

18. The liquid discharge apparatus according to claim 13, further comprising: a cleaning liquid tank connected to the channel to supply the cleaning liquid.

19. The liquid discharge apparatus according to claim 13, further comprising:

a dropper, the cleaning liquid being dropped from the dropper in response to an operation of a pump connected to the channel.

* * * * *